United States Patent [19]

Puydak et al.

[11] Patent Number: 5,021,500

[45] Date of Patent: Jun. 4, 1991

[54] DYNAMICALLY VULCANIZED ALLOYS OF CRYSTALLINE POLYOLEFIN RESIN AND HALOBUTYL RUBBER MATERIAL

[75] Inventors: Robert C. Puydak, Cranbury; Donald R. Hazelton, Chatham, both of N.J.; Silvestro Cartasegna; Leonard Dogniez, both of Brussels, Belgium

[73] Assignee: Exxon Chemical Company, Linden, N.J.

[21] Appl. No.: 528,264

[22] Filed: May 24, 1990

Related U.S. Application Data

[63] Continuation of Ser. No. 264,487, Oct. 28, 1988, abandoned.

[51] Int. Cl.$^5$ .................. C08L 15/02; C08L 23/10; C08L 23/26; C08K 5/17
[52] U.S. Cl. .................................. 524/525; 525/192; 525/193; 525/194; 525/232
[58] Field of Search ............... 525/194, 193, 192, 232; 524/525

[56] References Cited

U.S. PATENT DOCUMENTS

| | | | |
|---|---|---|---|
| 3,037,954 | 6/1962 | Gessler et al. | 260/29.8 |
| 3,641,215 | 2/1972 | Usamoto et al. | 260/897 |
| 4,104,210 | 8/1978 | Coran et al. | 260/4 R |
| 4,130,534 | 12/1978 | Coran et al. | 260/33.6 |
| 4,310,443 | 1/1982 | Maeda et al. | 525/194 |

FOREIGN PATENT DOCUMENTS 1533181  11/1978  United Kingdom .

OTHER PUBLICATIONS

Legge et al., Thermoplastic Elastomers, A Comprehensive Review, Munich Germany, Hanser Publications, 1987.

*Primary Examiner*—Carman J. Seccuro
*Attorney, Agent, or Firm*—W. G. Muller

[57] ABSTRACT

Thermoplastic polyolefin (TPO) compositions which have superior long-term heat aging characteristics are prepared by blending a crystalline thermoplastic resin with a halobutyl rubber under conditions of dynamic vulcanization and in the presence of a maleimide curative.

15 Claims, No Drawings

DYNAMICALLY VULCANIZED ALLOYS OF CRYSTALLINE POLYOLEFIN RESIN AND HALOBUTYL RUBBER MATERIAL

This is a continuation of application Ser. No. 07/264,487, filed Oct. 28, 1988, now abandoned.

BACKGROUND OF THE INVENTION

1. Field of the Invention

The present invention relates to thermoplastic elastomer compositions prepared by dynamic vulcanization techniques and, more particularly, relates to thermoplastic olefin (TPO) compositions comprising a crystalline polyolefin resin blended, under conditions of dynamic vulcanization, with a halobutyl rubber material in the presence of a maleimide curative. These thermoplastic elastomer compositions manifest superior heat aging characteristics and can be stabilized to U.V. exposure without adversely affecting other characteristics thereof.

2. Background of the Invention

Polymer blends which have a combination of both elastic and thermoplastic properties are generally obtained by blending an elastomeric composition with a thermoplastic composition in a manner such that the elastomer is intimately and substantially uniformly dispersed as a discrete phase within a thermoplastic continuous phase. Dynamic vulcanization techniques for producing such polymer blend compositions having both elastic and thermoplastic properties are described by Gessler and Haslett in U.S. Pat. NO. 3,037,954. This patent includes disclosure of a process wherein a vulcanizable elastomer is dispersed into a resinous thermoplastic polymer and subsequently cured while continuously mixing and shearing the polymer blend. The result is a micro-gel dispersion of cured rubber in an uncured matrix of resinous thermoplastic polymers.

Thermoplastic olefin (TPO) compositions are polymer blends wherein the elastometric composition includes an olefinic elastomer. These TPO compositions exhibit properties of a cured elastomer as well as the reprocessibility of a thermoplastic resin. The elastomeric characteristics are enhanced if the olefinic elastomer is wholly or partially cross-linked.

Thermoplastic olefin compositions which include a crystalline polyolefin resin blended with a butyl rubber material in the presence of a curing agent and under dynamic vulcanization conditions are known. For example, U.S. Pat. No. 4,130,534 discloses TPO compositions wherein a butyl rubber, preferably halogen-free butyl rubber, is blended with a crystalline thermoplastic polyolefin resin under conditions of dynamic vulcanization and in the presence of a curing agent selected from any curative system applicable for vulcanizing butyl or halobutyl rubber. Disclosures of such curatives include sulfur, phenolic resin, metal oxide, p-quinone dioxime or bismaleimide vulcanizing systems, the phenol-aldehyde resins are said to be preferred.

Although such TPO compositions are capable of withstanding temperatures of up to 150° C. for a relatively short period of time, after four to six weeks elongation significantly declines. Thus, such compositions are not optimal in applications requiring long-term heat aging characteristics such as in automotive under-hood applications, in appliances and in other high temperature environments.

It has now been discovered that utilization of a specific curing system, namely, a maleimide curing system, in combination with a halobutyl elastomer produces TPO compositions having unexpected long-term heat aging characteristics. Thus, the present invention is directed to TPO compositions having improved long-term heat aging characteristics and resides in providing TPO compositions wherein a crystalline polyolefin resin and a halobutyl elastomer are blended together under conditions of dynamic vulcanization and in the presence of a maleimide curative.

It has also been discovered that utilization of such maleimide curing systems in preparing TPO compositions which include a halobutyl rubber and a U.V. stabilizer is particularly suitable for producing ultraviolet stable TPO compositions having long-term heat aging characteristics. It has been found in the investigations leading to this invention that the crosslinking performance of curatives for halobutyl materials is significantly decreased in the presence of U.V. stabilizers. However, it has been surprisingly discovered that particularly for bromobutyl rubber, this decrease occurs to a much lesser degree in the presence of a maleimide curative system.

Additionally, it is an objective within the field of this invention to achieve TPO compositions that are white in color so as to be more attractive in applications such as appliances. Prior art products typically appear only in light beige/cream colors and are not as desirable for such uses.

Maleimide curatives for curing rubber components, other than butyl rubbers, of a blend of rubber and thermoplastic resin are known. See, for example, U.S. Pat. Nos. 3,641,215 and 4,104,210.

SUMMARY OF THE INVENTION

The present invention is directed to TPO compositions wherein a crystalline thermoplastic resin is blended with a halobutyl elastomer under conditions of dynamic vulcanization and in the presence of a maleimide curative system. Such TPO compositions manifest superior long-term heat aging characteristics and, unexpectedly, can be stabilized to U.V. exposure without adversely affecting other characteristics thereof. These compositions further can be prepared such that the final color is a desirable white.

DETAILED DESCRIPTION OF THE INVENTION

This invention relates to TPO compositions which have superior long-term heat aging characteristics and which are stable in the presence of U.V. stabilizers. The present invention resides in the discovery that TPO compositions which include halobutyl elastomer material manifest unexpected heat aging characteristics and unexpectedly retain certain beneficial properties in the presence of U.V. stabilizers when a particular curing system is utilized, namely, a maleimide curing system.

By "improved long-term heat aging characteristics" it is meant that a large percentage of tensile strength and elongation is retained, preferably retention of greater than 50%, over long periods of aging in a high temperature environment, e.g., at least about 70 hours at temperatures above about 120° C.

As used in the specification and claims, the term "dynamic vulcanization" means a vulcanization process for a rubber-containing TPO composition wherein the rubber is vulcanized under conditions of high shear. As a result, the rubber is cross-linked, or cured, simultaneous with dispersion of fine particles as a "micro-gel" within a polyolefin matrix.

Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding and the like. Scrap or flashing can be salvaged and reprocessed.

The term "dynamically vulcanized alloy" (DVA) as used in the specification and claims means a composition comprising a crystalline thermoplastic resin and an elastomer wherein at least a part of the elastomer has been dynamically vulcanized to a fully cured state. The coxpositions are prepared by blending together the polyolefin resin and elastomer with a specific class of curatives, as defined below, and, optionally, fillers and stabilizers, under conditions of dynamic vulcanization.

In preparing the DVA compositions of this invention, at least one crystalline polyolefin resin is blended with at least one halobutyl rubber preferably bromobutyl rubber, and the halobutyl rubber is vulcanized by dynamic vulcanization. The subject DVA's comprise from about 20 to about 80 wt.% dynamically vulcanized halobutyl rubber preferably from about 30 to about 75%, more preferably about 50 to about 75 wt.%, based on the total weight of the rubber plus plastic.

Butyl rubber is a copolymer of an isoolefin and a conjugated multiolefin. The useful copolymers comprise a major portion of isoolefin and a minor amount, preferably not more than 30 wt.%, of a conjugated multiolefin. The preferred copolymers comprise about 85–99.5 wt% (preferably 95–99.5 wt.%) of a C4–C7 isoolefin, such as isobutylene, and about 15–0.5 wt.% (preferably about 5–0.5 wt.%) of a multi-olefin of about 4–14 carbon atoms. These copolymers are referred to in the patents and literature as "butyl rubber"; see, for example, the textbook Synthetic Rubber by G. S. Whitby (1954 edition by John Wiley and Sons, Inc.), pages 838–891, etc. The term "butyl rubber" as used in the specification and claims includes the aforementioned copolymers of an isoolefin having 4–7 carbon atoms and about 0.5 to 20 wt.% of a conjugated multiolefin of about 4–10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is typically a copolymer of isobutylene and a minor amount of isoprene. It is generally prepared in a slurry process using methyl chloride as a vehicle and a Friedel-Crafts catalyst as the polymerization initiator. The methyl chloride offers the advantage that AlCl3, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. Nos. 2,356,128 and 2,356,129 incorporated herein by reference.

A typical continuous polymerization process is carried out in a draft tube reactor. Monomer feed and catalyst are continuously introduced at bottom of the draft tube where an axial flow pump is located. The pump circulates the slurry at high velocity to provide efficient mixing and heat transfer. Polymer slurry containing about 20–30 wt.% butyl rubber continuously overflows from the reactor through a transfer line.

Conventional high molecular weight butyl rubber generally has a number average molecular weight of about 25,000 to about 500,000, preferably about 80,000 to about 300,000, especially about 100,000 to about 250,000. Low molecular weight polymers have also been prepared with number average molecular weights of from 5,000 to 25,000.

A solution of the butyl rubber is then prepared for the halogenation of the butyl rubber. Any halogenation technique may be utilized. In the preferred method of halogenation a "solvent replacement" process is utilized to replace the methyl chloride solvent. Cold butyl rubber slurry in methyl chloride from the polymerization reactor is passed to an agitated solution in a drum containing a liquid hydrocarbon solvent such as hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flashing. Hexane recovered from the flash concentration step is condensed and returned to the solution drum.

The butyl rubber in solution is contacted with chlorine or bromine in a series of high-intensity mixing stages. Elemental halogen is present up to a maximum of about 1:1 molar ratio with enchained isoprene in the butyl feedstock. Hydrogen chloride or hydrogen bromide is generated during the halogenation step and must be neutralized in a subsequent step. The halogenated polymer in solution is contacted with steam and water in multiple vessels in order to vaporize the solvent and produce a slurry of halogenated butyl in water. The stripped slurry is finished using extrusion drying techniques well known in the art. Extrusion temperature must be kept low to prevent dehydrohalogenation and this is preferably achieved using gas injection into the drying extruder, as described in detail in U.S. Pat. No. 4,508,592, incorporated herein by reference. For a detailed description of the halogenation process see U.S. Pat. Nos. 3,023,191; 2,940,960 and 3,099,644 as well as Encyclopedia of Polymer Science and Engineering, Volume 8, Second Ed. 1987 (John Wiley & Sons) pp 435–436, which describes a continuous chlorination process, all of which are incorporated herein by reference.

Most recently, a process has been described for preparing halogenated butyl rubber in the melt phase using, e.g., an extrusion process. Details of the chlorination and/or bromination of butyl rubber by means of such a process is described in detail in U.S. Pat. Nos. 4,513,116; 4,548,995; and 4,554,326 incorporated herein by reference. In a preferred embodiment of such a process, butyl rubber is fed to an extruder at a controlled rate such that the reaction zone is not completely filled with rubber. A halogenation agent is fed to the temperature controlled reaction zone, preferably less than about 170° C. and an inert gas is injected at a point downstream of the reaction to sweep by-products and unreacted halogenating agent out of a vent. The halogenated product is stabilized, extruded from the extruder and cooled. Some molecular weight degradation is known to occur in both solution and extrusion processes, though the number average molecular weight of the preferred halobutyl rubber will be generally of the ranges indicated above for the butyl rubber.

Suitable thermoplastic polyolefin resins comprise crystalline, high molecular weight solid products from the polymerization of one or more monoolefins by either high pressure or low pressure processes. Examples of such resins are crystalline monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof as well as crystalline copolymers thereof. Reactor copolymers, copolymers produced by series reactors are also suitable. Commercially available thermoplastic polyolefin resin, and preferably polyethylene or polypropylene, including reactor blends or impact copolymers, may be advantageously used in the practice of the invention. A preferred thermoplastic polyolefin is an ethylene-propylene random copolymer containing from about 2 wt.% to about 8 wt.% ethylene.

In addition to its polymer component, the DVA composition of this invention can include modifiers such as reinforcing and non-reinforcing fillers, antioxidants, stabilizers, rubber processing oils, lubricants (e.g., oleamide), antiblocking agents, antistatic agents, waxes, coupling agents for the fillers, foaming agents, flame retardants, pigments and other processing aids known to the rubber compounding art. The pigments and fillers can comprise up to about 60 wt.% of the total DVA composition based on polymer component plus additives. Preferably pigments and fillers comprise from about 0 to about 30 wt.% of the total composition. Such modifiers can typically be added before, during or after curing, though, as discussed below, certain stabilizers contribute to overall better properties when added during or before curing.

Fillers can be inorganic fillers such as calcium carbonate, clays, talc, titanium dioxide, silica or carbon black. Any type of carbon black can be used, such as channel blacks, furnace blacks, thermal blacks, acetylene black, lamp black and the like. Use of certain fillers, such as titanium dioxide, also considered to be a pigment, can surprisingly result in a white color for the final product of the invention since there appears to be insufficient interaction of the taught curing agents with the fillers to affect final coloration.

Stabilizers can include ultraviolet stabilizers and the compositions of the present invention are not adversely affected in the presence thereof. It has been found that addition of U. V. stabilizers to TPO compositions can significantly decrease the crosslinking performance of curatives utilized for halobutyl elastomer materials. Unexpectedly, such decrease does not occur to the same extent when the curative system is a maleimide curative system. Suitable U.V. stabilizers include hindered amine light stabilizers (HALS) which belong to a class of compounds referred to as hindered amines. These hindered amines have been found to be effective in stabilizing polymers. See for example U.S. Pat. No. 4,064,102 incorporated herein by reference. Commercially available HALS include Tinuvin 770 and Chimassorb 944 LD, which are said to be bis(2,2,6,6-tetramethyl-4-piperidyl) sebacate and poly((6-((1,1,3,3-tetramethylbutyl) amino)-s-Triazine-2,4-diyl)((2,2,6,6-tetramethyl-4-piperidyl) imino)hexamethylene ((2,2,6,6-tetramethyl-4-piperidyl) imino)), respectively.

Rubber process oils have particular ASTM designations depending on whether they fall into the class of paraffinic, naphthenic or aromatic process oils. They are typically derived from petroleum fractions. The type of process oil utilized will be that customarily used in conjunction with the rubber component. The skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the DVA. This ratio can vary from about 0 to about 1.5/1; preferably from about 0.2/1 to about 1.2/1; more preferably from about 0.6/1 to about 1/1. Larger amounts of process oil can be used, the deficit being reduced physical strength of the composition. Oils other than petroleum based oils such as oils derived from coal tar and pine tar, or prepared synthetically, can also be utilized. In addition to the described rubber process oils, organic esters and other synthetic plasticizers can be utilized.

Antioxidants can be utilized in the composition of this invention, the particular antioxidant utilized will depend on the rubber material utilized and more than one type may be required. Their proper selection is well within the skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating and shield the part from oxygen, ozone and the like.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis(4-methyl-6-1, butylphenol); 2,6'-di-t-butyl-o-dimethylamino-p-cresol; hydroquinone monobenzyl ether; octylated diphenyl amine; phenyl- beta-naphthylamine; N,N'-diphenylethylene diamine; aldol- alpha-naphthylamine; N,N'-diphenyl-p-phenylene diamine. The physical antioxidants include mixed petroleum waxes and microcrystalline waxes.

The compositions of this invention are blended under conditions of dynamic vulcanization in the presence of a maleimide curing system. The maleimide compound preferably used in the invention is a bismaleimide compound. Among the maleimide compounds, a bismaleimide compound is especially superior in effectiveness and m-phenylene bismaleimide (4,4'-m-phenylene bismaleimide) is preferred. Examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4, 4'-biphenyl bismaleimide, o-phenylene bismaleimide, m-phenylene bismaleimide (HVA-2), hexamethylene bismaleimide and 3,6-durine bismaleimides.

The maleimide curative systems include an effective amount of a maleimide curing agent. By "effective amount" it is meant that the amount is sufficient to effect a fully cured state of at least a portion of the halobutyl elastomer. Such effective amounts range from about 0.5 to about 4 phr (parts per hundred rubber). A halobutyl-containing DVA prepared with an effective amount of a maleimide curative has been found to have long term heat aging characteristics and, unexpectedly, retains the beneficial properties in the presence of U.V. stabilizers. Hindered amine light stabilizers include metal salts which appear to be detrimental to chloro- and bromobutyl materials. Though not wishing to be bound by any theory, this is thought to be due to removal of halogen through a dehydrohalogenation reaction. The dehydrohalogenation reaction is believed to compete with the curing process. Thus, it is believed that utilization of a maleimide curing system increases the curing rate sufficiently to substantially reduce the adverse effects of hindered amine light stabilizers.

In the practice of this invention the polyolefin resin and rubber are mixed together at a temperature above the melting point of the resin. After the resin and rubbers, and, optionally, modifiers such as a U.V. stabilizer, are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin to about 250° C. More typically, the temperature range is about 150° C. to about 225° C. Preferably the vulcanization is carried out at a temperature of about 160° C. to about 200° C.

It is preferred that the mixing process be continued until vulcanization is complete. If vulcanization is permitted to continue after mixing has stopped, the composition will not be reprocessible as a thermoplastic. However, the dynamic vulcanization can be carried out in stages. For example, vulcanization can be commenced at high temperatures in a twin screw extruder and, before vulcanization is complete, pellets can be formed of the partially prepared DVA using an underwater pelletizer, thereby quenching the curing step. At a later time vulcanization can be completed under dynamic vulcanization conditions. Those skilled in the art will appreciate the appropriate quantities and extent of mixing time required to carry out the vulcanization of the rubber. Where necessary the rubber can be vulcanized using varying amounts of curative to determine the optimum cure conditions to achieve a full cure.

The term "fully vulcanized" as used in the specification and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component blends to the extent that the composition contains no more than about four percent by weight of the cured rubber component extractable at room temperature by a solvent which dissolves the rubber to be vulcanized, and preferably to the extent that the composition contains less than two percent by weight extractable material. In general, the less extractables of the cured rubber component, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-5}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is a reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation. J. Rubber Chem. and Tech., 30, p. 929. The appropriate Huggins solubility parameters for rubber-solvent pairs used in the calculation were obtained from the review article by Sheehan and Bisio, J. Rubber Chem. & Tech., 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable material.

Non-limiting examples are set forth below for illustrative purposes only and represent the best mode for preparing the DVA compositions of the present invention. Formulations are based on weight % unless otherwise specified.

EXAMPLE I

Comparative and inventive compositions as described in TABLE I were mixed in a 3 lb. Banbury mixer utilizing a 10 to 11.5 minute cycle. The blend compositions were dynamically vulcanized during such cycle by prolonging the mix for about 4 minutes after the addition of the curing agent and dumping or discharging at an elevated temperature of about 400 to about 460° F.

As can be seen, the composition Sample C, wherein a maleimide curative system is utilized, is significantly superior in long-term severe temperature heat aging as compared to composition of Sample B, which does not include a maleimide. B has lost most of its elongation and tensile strength after 70 hours at 150° C. The composition of Sample A is deficient in compression set resistance and therefore is significantly inferior to the composition of Sample C and was not considered for heat age testing.

TABLE I

|  | A | B | C |
| --- | --- | --- | --- |
| Bromobutyl 2244 | 50 | 50 | 50 |
| Exxon PD 9122 | 17 | 17 | 17 |
| (PPRC - 2% $C_2$, 2 MFR) |  |  |  |
| Maglite D | 0.5 | 0.5 | 0.5 |
| Atomite ($CaCO_3$) | 6.6 | 8.2 | 10.2 |
| Flexon 815 Oil | 20 | 20 | 20 |
| Irganox 1010 | 0.1 | — | — |
| Vanox MTI | — | 0.5 | 0.5 |
| Stearic Acid | 0.8 | 0.8 | 0.8 |
| Curatives |  |  |  |
| SP 1055 Resin | — | — | — |
| Protox 169 | 4 | — | — |
| (French process ZnO) |  |  |  |
| Polyslab Thiate E | — | — | — |
| ZDEDC | 1 | — | — |
| HVA-2 | — | — | 1 |
| Diak #1 | — | 1 | — |
| Maglite D | — | 2 | — |
| Spiral Flow Test | 15-½ | 16 | 15 |
| Centimeters |  |  |  |
| Mold Shrinkage, % | 3 | 3 | 2 |
| Physical Properties - Injection Molded |  |  |  |
| Shore A Hardness, |  |  |  |
| Instantaneous | 72 | 66 | 70 |
| 10 Seconds | 63 | 60 | 65 |
| Shore D Hardness, |  |  |  |
| Instantaneous | 22 | 21 | 24 |
| 10 Seconds | 13 | 12 | 15 |
| Tensile Strength, | 1120 | 1060 | 1120 |
| psi (MPa) | (7.7) | (7.3) | (7.7) |
| Elongation, % | 130 | 190 | 130 |
| Tear Strength | 160 | 130 | 140 |
| Die B, lb/inch (kN/m) | (28) | (23) | (25) |
| Compression Set B. plied | 55 | 39 | 34 |
| 22 hr @ 100 C., % |  |  |  |
| Fluid Immersion 77 hr @ 100 C. |  |  |  |
| Volume Increase, % |  |  |  |
| Distilled Water | 12 | 11 | 10 |
| ASTM #3 Oil | 200 | 150 | 120 |
| Heat Aging Stability in Air Oven (micro-dumbbells) |  |  |  |

TABLE I-continued

|  | A | B | C |
| --- | --- | --- | --- |
| Unaged Control |  |  |  |
| Shore A Hardness | — | 66 | 70 |
| Tensile Strength, psi | — | 700 | 830 |
| Elongation, % | — | 530 | 450 |
| Aged 70 hrs. @ 150 C. |  |  |  |
| Shore A Hardness | — | 46 | 68 |
| Points Change | — | −20 | −2 |
| Tensile Strength, psi | — | 70 | 710 |
| % Retention | — | 10 | 86 |
| Elongation, % | — | 60 | 440 |
| % Retention | — | 11 | 98 |
| Aged 240 hrs. @ 150 C. |  |  |  |
| Shore A Hardness | — | * | 68 |
| Points Change | — | * | −2 |
| Tensile Strength, psi | — | * | 740 |
| % Retention | — | * | 90 |
| Elongation, % | — | * | 620 |
| % Retention | — | * | 136 |

*too badly deteriorated to test

EXAMPLE II

This example provides illustration of the long term superior heat aging characteristics of this invention. The dynamic vulcanizate composition consisting of the components listed in Table II was aged for 60 days at 150° C. Both tensile strength and elongation measurements indicate good retention values.

TABLE II

| DYNAMIC VULCANIZATE |  |
| --- | --- |
| Bromobutyl 2244 | 42 |
| Neste PP 7824 | 16 |
| Calcium Carbonate | 1.2 |
| $TiO_2$ (DuPont R101) | 3 |
| Flexon 815 Paraffinic Oil | 32 |
| Maglite D MgO | 0.5 |
| Stearic Acid | 0.5 |
| Irganox 3114 | 0.1 |
| Ultranox 626 | 0.2 |
| Vanox MTI | 0.5 |
| ZnO | 3 |
| HVA 2 | 1 |
| Density (g/cm$^3$) | 0.98 |
| Flow Properties |  |
| Spiral Flow, cm | 19 |
| Melt Index, gm/10 min., 10 Kg, 23° C. | 15 |
| Physical Properties |  |
| Injection Molded and Die Cut Dumbbells: |  |
| Hardness, Shore A, Inst./10 sec. | 68/65 |
| 100% Modulus, psi (MPa) | 360 (2.5) |
| Tensile strength, psi (MPa) | 700 (4.8) |
| Elongation | 260 |
| Tear Strength, ASTM D624, Die C, lb/in (kN/m) | 95 (16.6) |
| Thermal Properties |  |
| Compression Set B. % | 36 |
| 22 hr. @ 100 C. |  |
| Heat Aging Stability in Air Oven Aged 60 days @ 150 C. |  |
| Tensile Strength, % retention | 99 |
| Elongation, % retention | 170 |

EXAMPLE III

This example illustrates the effects of adding U.V. stabilizers of the hindered amine light (HALS) type. Comparison of compositions B with A showed crosslinking performance of a chlorobutyl elastomer composition with a phenolic resin cure (SP 1045) was substantially impaired in the presence of the HALS compounds. Compositions C and D showed substantial improvement in cross-linking performance, both with and with out the HALS compounds, when cured with a bismaleimide system (HVA-2). Comparison of compositions E and F showed impared cross-linking performance for a brombutyl elastomer composition cured with SP1045 in the presence of the HALS compounds. Compositions G and H showed substantial improvement in cross-linking performance, again both with and without the HALS compounds, when cured with HVA-2.

Table IIIc shows the effects of adding the HALS U.V. stabilizer to a bromobutyl DVA both before and during curing. Addition of HALS after curing, as might be done in an effort to avoid the decrease of cross-linking performance when added before or during, resulted in significantly lower values for 100% Modulus, Tensile Strength, Elongation at Break, and Low Temperature Compression Set.

TABLE IIIa

|  | A | B | C | D | E | F | G | H |
|---|---|---|---|---|---|---|---|---|
| Chlorobutyl 1066 | x | x | x | x |  |  |  |  |
| Bromobutyl 2244 |  |  |  |  | x | x | x | x |
| Tinuvin 770 |  | x |  | x |  | x |  | x |
| Chemassorb 944D |  | x |  | x |  | x |  | x |
| HVA2 |  |  | x | x |  |  | x | x |
| SP 1045 | x | x |  |  | x | x |  |  |
| ORD (200° C.) |  |  |  |  |  |  |  |  |
| M (change in peak modulus) (A as reference - 100) | 100 | (1) | 208 | 169 | 89 | 63 | 189 | 191 |
| $t_{90}$, minutes (time to reach 90% peak modulus) | 11.8 | (1) | 5.7 | 14.7 | 4.8 | 8.5 | 3.5 | 7.6 |
| Average crosslink rate (A as reference - 100) | 100 | (1) | 723 | 81 | 115 | 38 | 577 | 96 |
| Maximum crosslink rate (A as reference - 100) | 100 | (1) | 700 | 64 | 110 | 28 | 460 | 136 |
| FORMULATION (In parts by weight) |  |  |  |  |  |  |  |  |
| Halobutyl | 100 |  |  |  |  |  |  |  |
| Maglite D Magnesium Oxide | 1.2 |  |  |  |  |  |  |  |
| Oil | 40 |  |  |  |  |  |  |  |
| TiO$_2$ | 30 |  |  |  |  |  |  |  |
| Zinc Oxide | 5.1 |  |  |  |  |  |  |  |
| Ultranox 626 | 0.4 |  |  |  |  |  |  |  |
| Irganox 3114 | 0.2 |  |  |  |  |  |  |  |
| Tinuvin 770 | 0.4 |  |  |  |  |  |  |  |
| Chimassorb 944D | 0.4 |  |  |  |  |  |  |  |

(1) Modulus value did not peak but continued to increase with time.

Table IIIb shows dynamic vulcanization of halobutyl elastomers in polypropylene in the presence of the HALS U.V. stabilizer with both phenolic resin curatives (SP 1045) and HVA-2 curatives. PEAK refers to the maximum torque measured on a 1.3. Banbury that results from the cross-linking of the rubber phase. TIME TO PEAK refers to the time required to reach the state of maximum cross-linking, as measured by maximum torque. Both a high state of crosslinking and fast rate of cure (cross-linking) is desirable to achieve the best properties with most economic production. As appears in the following table, only the use of bromobutyl elastomer with the HVA-2 curing system retains a both high cross-link state and fast cure in the presence of HALS. The use of chlorobutyl elastomer showed substantially improved cure time but at the loss of cross-link state.

TABLE IIIb

HALOBUTYL/POLYPROPYLENE
DYNAMICALLY VULCANIZED ALLOYS
1.3 1. Banbury/Torque Pattern During Crosslinking

|  | Peak (%) | Time to Peak (Min) |
|---|---|---|
| Chlorobutyl/SP 1045 Cure/HALS | +40 | 11 |
| Chlorobutyl/HVA2/HALS | +7 | 0.3 |
| Bromobutyl/SP 1045 Cure/HALS | +28 | 1.4 |
| Bromobutyl/HVA2/HALS | +53 | 0.3 |

TABLE IIIc

| BROMOBUTYL/POLYPROPYLENE DVA[1] | | |
|---|---|---|
| Mixing Cycle[2] | A | B |
| Mechanical Properties (Injection Moulding) | | |
| Shore A, inst/5 sec/30 sec | 72/67/66 | 70/66/63 |
| 100% Modulus, MPa | 2.65 | 2.52 |
| Tensile Strength, MPa | 5.7 | 4.12 |
| Elongation at break, % | 255 | 194 |
| Compression Set, % | | |
| −25° C. | 71 | 62 |
| +100 C. | 39 | 41 |

[1]TPO formulation Bromobutyl elastomer/Polypropylene/TiO$_2$/oil/ZnO/HVA2/HALS/Antioxidant
[2]A = HALS added at beginning of cycle B = HALS added after maximum cross-linking.

EXAMPLE IV

Table IV shows the superior long term heat aging characteristics of compositions of the present invention as compared to a presently commercial, EPDM-based product. This product does not utilize a maleimide curative system but is believed to utilize a halogenated alkylphenol resin curative. Additionally, the composition of the invention was white in color as opposed to the light beige/cream color of the comparative product.

TABLE IV

|  | Reference-Commercial Product A[1] | Invention[2] |
|---|---|---|
| Experimental TPE Specific Gravity | 0.98 | 0.98 |
| Flow Properties | | |
| Spiral Flow, cm | 16.5 | 17 |
| Melt Index, gm/10 min., 10 Kg, 23° C. | 36 | 30 |
| Physical Properties | | |
| Color | Light Beige or Cream | White |
| Injection Molded and Die Cut Dumbbells: | | |
| Hardness, Shore A, Inst./10 sec. | 72/69 | 72/69 |
| 100% Modulus, psi | 520 | 475 |
| Tensile Strength, psi | 1140 | 900 |
| Elongation | 470% | 280% |
| Thermal Properties | | |
| Compression St B, % | | |
| 22 Hr. 100 C. | 42 | 40 |
| 22 Hr. 150 C. | 56 | 68 |
| High Temperature: | | |
| Air Over Aging, 2 Wks. 150 C. | | |
| Hardness Change, Points | +4 | +1 |
| % Tensile Retained | 129 | 106 |
| % Elongation Retained | 72 | 93 |
| Air Over Aging, 30 Days 150 C. | | |
| Hardness Change, Points | +4 | −4 |
| % Tensile Retained | 90 | 95 |
| % Elongation Retained | 52 | 75 |
| Air Over Aging, 45 Days 150 C. | | |
| Hardness Change, Points | +4 | +5 |
| % Tensile Retained | 69 | 94 |
| % Elongation Retained | 36 | 81 |
| Air Over Aging, 60 Days 150 C. | | |
| Hardness Change, Points | +3 | +5 |
| % Tensile Retained | 48 | 83 |
| % Elongation Retained | 7 | 74 |
| Dynamic Vulcanizate | | |
| Bromobutyl 2244 | 42.0 | |
| Maglite D Magnesium Oxide | 0.5 | |
| PP 5052 Polypropylene | 18.0 | |
| Nucap 190 Clay | 3.5 | |
| Titanox 2071 | 3.0 | |
| Stearic Acid | 0.5 | |
| Sunpar 150 Oil | 28.0 | |
| Vanox MTI | 0.5 | |
| Protox 169 | 3.0 | |
| HVA-2 | 1.0 | |

[1]Santoprene ® 201-73, Monsanto Chemical Company
[2]Base Formulations: Bromobutyl Based DVA Cured Using HVA-2

TABLE V

INGREDIENT LIST

| Designation | Description | Supplier |
|---|---|---|
| Bromobutyl 2244 | Brominated isoprene-isobutylene copolymer, 41-51 Mooney viscosity (1 + 8) 125 C. | Exxon Chemical Americas |
| Exxon PD 9122 | Random reactor polypropylene copolymer having 2 wt. % ethylene and MFR of 2 | Exxon Chemical Americas |
| Neste PP 7824 | Random reactor copolymer of propylene with minor amount ethylene, MFR of 0.4 | Neste Polypropylen N.V. Beringen, Belgium |
| PP 5052 | Polypropylene homo-polymer, density 0.90 g/cm$^3$, MFR 1.2 | Exxon Chemical Americas |
| Maglite D | Magnesium oxide | CP Hall Co. |
| Atomite (CaCO$_3$) | Natural ground calcium carbonate, mesh particle size 3 microns | Thompson, Weinman & Co. |
| Sunpar 150 Oil | Paraffinic Oil, STM 104b | Sun Oil Company |
| Flexon 815 Oil | Low volatility naphthenic process oil | Exxon Chemical Co. |
| Irganox 1010 | Hindered phenolic antioxidant, thermal stabilizer | Ciba-Geigy |
| Vanox MTI | 2-Mercaptotoluimidiazole | R. T. Vanderbilt Co., Inc. |
| Stearic Acid | Long chain fatty acid | Several |

TABLE V-continued

INGREDIENT LIST

| Designation | Description | Supplier |
| --- | --- | --- |
| Curatives | | |
| SP 1055 Resin | Brominated alkyl phenol resin | Schenectady Chemical |
| Protox 169 (French process ZnO) | French process zinc oxide | New Jersey Zinc |
| Polyslab Thiate E | 75% active trimethyl thiourea | Polymerics Inc. |
| ZDEDC | Zinc diethyldithiocarbamate | R. T. Vanderbilt Co., Inc. |
| HVA-2 | N,N'-m-phenylenedimaleimide | E. I. DuPont |
| Diak #1 | Hexamethylene diamine carbamate | E. I. DuPont |
| Antioxidants | | |
| Irganox 3114 | Tris (3,4-di-tert-butyl-4-hydroxybenzyl) isocyanurate | Ciba-Geigy |
| Ultranox 626 | Bis (2,4-di-tert-butyl-phenyl) peutaerythridol diphosphate | Borg-Warner Chemicals |
| Stabilizers | | |
| Tinuvin 770 | Bis (2,2,6,6-tetramethyl-4-piperidyl)sebacate | Ciba-Geigy |
| Chimassorb 944 LD | Poly((6-((1,1,3,3-tetramethylbutyl)amino)-s-triazine-2,4-diyl)((2,2,6,6-tetramethyl-4-piperidyl)imino) hexamethylene((2,2,6,6-tetramethyl-4-piperidyl)imino)) | Ciba-Geigy |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A thermoplastic olefin composition having improved long-term heat aging characteristics comprising a crystalline polyolefin blended with from about 20 to about 80 wt.% of a halobutyl rubber material under conditions of dynamic vulcanization and in the presence of a curing system containing from 0.5 to 4.0 phr (parts per hundred) of a maleimide curing agent so as to effect a fully cured state of at least a portion of the halobutyl rubber.

2. The composition of claim 1 wherein said halobutyl rubber material is bromobutyl elastomer.

3. The composition of claim 1 wherein said crystalline polyolefin is an ethylene-propylene random copolymer having from about 2 wt.% to about 8 wt.% ethylene based on the total weight of the copolymer.

4. The composition of claim 3 wherein said random copolymer is present in an amount of from about 20 wt.% to about 90 wt.% based on the total weight of polyolefin plus rubber material.

5. The composition of claim 1 wherein said maleimide curing system comprises m-phenylene bismaleimide.

6. The composition of claim 1 wherein said polyolefin is homopolypropylene.

7. The composition of claim 1 additionally comprising an effective amount of at least one of the following modifiers: fillers, flame retardants, antioxidants, stabilizers, rubber processing oils, lubricants, antiblocking agents, waxes, coupling agents for said fillers, foaming agents and pigments.

8. The composition of claim 7 wherein said stabilizer is a hindered amine light stabilizer.

9. The composition of claim 7 wherein said filler is titanium dioxide.

10. A method for preparing the thermoplastic olefin composition of claim 1 having improved long-term heat aging characteristics comprising:
A. mixing a crystalline polyolefin with a halobutyl rubber material at a temperature at or above the melting point temperature of said crystalline polyolefin;
B. adding subsequently a maleimide curing system while mixing to permit dynamic vulcanization.

11. The method of claim 10 additionally comprising adding prior to completion of dynamic vulcanization an effective amount of at least one of the following modifiers: fillers, flame retardants, antioxidants, stabilizers, rubber processing oils, lubricants, antiblocking agents, waxes, coupling agents for said fillers, foaming agents and pigments.

12. The method of claim 11 wherein said stabilizer is a hindered amine light stabilizer.

13. The method of claim 11 wherein said filler is titanium dioxide.

14. The method of claim 10 additionally comprising the steps of adding a hindered amine light stabilizer prior to completion of dynamic vulcanization and adding after completion of vulcanization at least one additional modifier.

15. The method of claim 14 wherein said additional modifier comprises titanium dioxide.

* * * * *